(12) United States Patent
Carr et al.

(10) Patent No.: US 8,127,059 B1
(45) Date of Patent: Feb. 28, 2012

(54) APPARATUS FOR INTERCONNECTING HOSTS WITH STORAGE DEVICES

(75) Inventors: Larrie Simon Carr, Nelson (CA); Heng Liao, Belcarra (CA); Nicholas Kuefler, Port Moody (CA); Keith Shaw, Port Coquitlam (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 250 days.

(21) Appl. No.: 11/470,112

(22) Filed: Sep. 5, 2006

Related U.S. Application Data

(60) Provisional application No. 60/713,327, filed on Sep. 2, 2005, provisional application No. 60/713,325, filed on Sep. 2, 2005, provisional application No. 60/713,326, filed on Sep. 2, 2005, provisional application No. 60/723,446, filed on Oct. 5, 2005.

(51) Int. Cl.
*G06F 13/12* (2006.01)
*G06F 13/00* (2006.01)

(52) U.S. Cl. .......................... 710/74; 711/100

(58) Field of Classification Search ................ 710/74
See application file for complete search history.

(56) References Cited

U.S. PATENT DOCUMENTS

| | | | | |
|---|---|---|---|---|
| 6,792,486 | B1 * | 9/2004 | Hanan et al. | 710/74 |
| 2003/0131182 | A1 * | 7/2003 | Kumar et al. | 711/5 |
| 2004/0252672 | A1 | 12/2004 | Nemazie | |
| 2004/0252716 | A1 * | 12/2004 | Nemazie | 370/447 |
| 2006/0095625 | A1 * | 5/2006 | Wootten et al. | 710/300 |

* cited by examiner

*Primary Examiner* — Henry Tsai
*Assistant Examiner* — Juanito Borromeo
(74) *Attorney, Agent, or Firm* — Mukundan Chakrapani; Borden Ladner Gervais LLP

(57) ABSTRACT

A system and method for providing redundant access paths to a storage device make use of a processor to analyze instructions received from hosts to allow for command queuing, host switching, and command replacement where necessary. The system allows for either Serially Attached SCSI or Serial ATA hard drives to be connected to the same topology and to require no host intervention on the coordination of drive access in a multi-host environment. A single ported SATA device can then appear multi-ported and can support a redundant architecture within a SAS topology.

28 Claims, 6 Drawing Sheets

APPARATUS FOR INTERCONNECTING HOSTS WITH STORAGE DEVICES

CROSS REFERENCE TO RELATED APPLICATIONS

This application claims the benefit of priority of U.S. Provisional Patent Application No. 60/713,327 filed Sep. 2, 2005, U.S. Provisional Patent Application No. 60/713,325 filed Sep. 2, 2005, U.S. Provisional Patent Application No. 60/713,326 filed Sep. 2, 2005, and of U.S. Provisional Patent Application No. 60/723,446 filed Oct. 5, 2005, which are incorporated herein by reference and is related to co-pending application Ser. No. 11/470,078 entitled "COMMAND SWITCHING FOR MULTIPLE INITIATOR ACCESS TO A SATA DRIVE" and to co-pending application Ser. No. 11/470,042 entitled "SERIAL ATTACHED SCSI (SAS)/SERIAL ATA (SATA) RATE SNOOP ALGORITHM" both filed concurrently herewith and incorporated herein by reference.

FIELD OF THE INVENTION

The present invention relates generally to storage networking elements. More particularly, the present invention relates to host to storage device communications in storage networks.

BACKGROUND OF THE INVENTION

Serial ATA (SATA)-compliant devices, such as SATA hard disk drives and other SATA storage devices, are widely used in the consumer personal computer (PC) industry. The SATA specification generally describes a point-to-point interface between a host computer and an ATA device. Due to the large volumes driven by the consumer PC industry, SATA drives provide large storage capabilities at decreasing prices. However, SATA drives have only a single port for connecting to a single host, and the SATA architecture only supports one host with the ATA command set. This is acceptable in consumer PC applications, which do not typically require redundant architectures. In applications, such as storage networks for server-based and storage array-based applications, that require redundant data storage and/or access, a redundant array of independent drives (RAID) and/or a SAS system can be used.

SAS systems can maintain redundant access paths to storage devices, and are widely deployed in storage networks due to their performance and reliability. The SAS standard specifies a protocol stack that provides a serial physical interconnect that can be used to connect target devices and hosts together. It specifies the transport layer protocols, transport small-computer system interface (SCSI) commands, Serial ATA tunneling and management commands used to communicate between hosts and storage devices. The protocol is intended to be used in conjunction with SCSI and ATA command sets, as it reuses the physical interface of the SATA specification.

The SAS standard defines three basic components: initiators (or hosts), expanders, and targets (or peripheral devices, such as storage devices). SAS system components can include SAS hosts, SAS expanders, SAS devices, SATA drives, SATA port selectors and SATA port multipliers. The sum of all components used in a SAS implementation is known as the SAS domain. Initiators may be provided as an on-board component of a motherboard, or through the use of an add-on host bus adapter (HBA). Expanders are part of the service delivery subsystem and facilitate communication between SAS components. Generally, SAS expanders provide switching and routing functions to the SAS system components connected to them. SAS expanders allow multiple SAS components to be connected together to form a SAS topology. By creating two independent topologies, redundant paths between the SAS system components can be created.

As noted above, a SATA drive can be considered a SAS system component, as SAS expanders are capable of converting the tunneled SATA protocol (SATA Tunneled Protocol or STP) received from a host into a SATA serial interface compatible with a SATA drive. Due to their single-ported nature, SATA drives can only be directly connected to a single SATA host. To provide multiple hosts access to a single SATA drive, the drive can be connected to a SAS expander and then be available in a SAS topology. However, when connected to a SAS expander, the SATA drive can still only respond to one host at a time, requiring the hosts to coordinate access with each other. This process is inefficient. In addition, since a SATA drive can only be connected to a single SAS expander, that single expander becomes a non-redundant point of failure.

To address this, the SAS standard supports the use of a SATA port selector in a SAS topology. The port selector can connect to a SATA drive and to two SAS expanders, but, because the SATA drive is unaware that it is being accessed by two hosts, the hosts must coordinate their communication with the SATA drive. Since the ATA command set used by SATA drives is designed for a single host, a host must complete a desired operation with the SATA drive before relinquishing the drive to the other host. In other words, the host must ensure that the SATA drive is in an idle state before the port selector changes state. The port selector state is generally controlled by either side-band or protocol-based methods. Side-band methods require one or more electrical signals to be transmitted from the hosts to the port selector. Specific events, such as a rising edge on one of the signals, communicate to the port selector that it should change state. Protocol-based methods use a pattern of out-of-band (OOB) events to communicate a state change.

SATA port selectors allow 2 hosts to share access to a SATA drive. However, a SATA port selector only provides hosts with alternating, but still exclusive, access to the SATA drive. Storage applications are efficient if hosts are able to issue commands in close succession, and have the target receive and respond to those commands in a timely manner. While the use of SATA port selectors provides alternating access and redundancy, they do not provide concurrent access for multiple hosts and therefore detrimentally affects the system performance as it is wasteful of resources.

In addition to their single port limitation, SATA drives did not originally support command queuing, while SAS devices support Tagged Command Queuing. The SATA II specification extended the original SATA specification by defining a simple and streamlined command queuing model for SATA drives. This Native Command Queuing (NCQ) increases performance of SATA drives by allowing the individual device to receive more than one request at a time and decide which to complete first. For example, using detailed knowledge of its own seek times and rotational position, a SATA hard disk drive can compute the best order in which to perform input/output (I/O) operations. This can reduce the amount of unnecessary seeking of the drive's heads, resulting in increased performance and decreased wear, particularly for server-type applications where multiple simultaneous read/write requests are often outstanding. The SATA II specification provides a mechanism to identify these commands by a queue tag in a manner that is compatible with the original SATA specification. However, NCQ commands must still be issued as a contiguous series of frames to and from the target. This poses a problem for two hosts independently seeking access to a SATA drive.

Relying upon hosts to coordinate access to a single device causes difficulties on a number of levels. On one level, it removes the transparency of conventional SAS topologies, and requires that hosts interact with each other to coordinate drive access in real time. In a simple configuration, this may be possible, but causes problems if more than two hosts contend for a single SATA drive. Multiple hosts attempting to gain exclusive access to a single SATA target will experience long wait times for each request, which would not happen if they had simultaneous access. Further delays are caused during the switch over event as control of the drive passes from one host to another. These factors detrimentally impact system performance. On another level, coordination may require that hosts have knowledge of the configuration of a device, and base their access to the device on that knowledge. This makes replacing the drive with another device more difficult at a later date. As well, the coordination must handle error conditions such as when the device owner fails and/or disappears unexpectedly.

SUMMARY OF THE INVENTION

There is provided a multi-ported apparatus designed to allow two or more hosts to concurrently access a target device, for example a storage device. The apparatus includes a host interface for interfacing with hosts, and a target device interface for communicating with target devices, for example storage drives. The interfaces are flexible in design, so that the apparatus is capable of communicating with either a SAS or SATA device. For example, the switch can operate so as to appear as a SAS device to a SAS host, and can also operate so as to appear as a SATA host when connecting to a SATA device.

Advantageously a host can communicate as if connected directly to a drive, without any modifications needed at the host or drive. For example, the apparatus can communicate with one of a number of connected SAS hosts while being connected to a SATA drive via its storage device interface.

Embodiments of the invention provide a multi-port switch; a method of command switching; and a method of emulating a target device for multiple hosts by presenting an independent instance of a virtual device to each host interface, each having the functionality of the emulated physical target device. The switch provides each host with concurrent access to the target device in the sense that each host communicates with their virtual target device without knowledge of either the switch, or the shared nature of the target device. In other words, each host can operate independently and communicate with their corresponding virtual target device without causing interference to the operation of the other host/virtual target device pair. The switch provides hosts with concurrent access to a device by receiving and buffering commands as they arrive, and then executes an intelligent command switching function for interleaving and transmitting the commands to the device. The communication between the switch and the physical target device complies with the protocol supported by the device so that no modifications are needed for the physical target, which is not aware that the operations have originated from multiple physical hosts.

Hence the communication between the host and virtual target devices, and between the switch with the physical target is considered to be fully transparent, both for normal command execution, as well as for error indicator propagation and error recovery procedure. This transparency enables the switch to be used in SAS/SATA systems without modification to the surrounding components in the system including the host/initiator devices, SAS expander devices, and target devices (e.g., disk drives). For example, a SATA drive attached to the switch is unaware that it is being accessed by more than one host.

The switch is able to perform a discovery function to determine the nature of the connected hosts and target device. For example, when the host device type is SATA, the switch can emulate a SATA virtual device for each host interface. When the switch communicates with a SAS host device (either an initiator or via a SAS expander), a couple of options are available: in one embodiment of the invention, the switch emulates a SATA virtual target device for each host interface; in an alternative embodiment, the switch emulates a SAS-STP (SATA Tunneled Protocol) virtual target device per host interface.

According to an embodiment of the invention, the apparatus is not required to terminate all traffic, and instead can terminate a subset of the traffic. The termination of a subset of traffic from host allows the interface switch to take action on terminated commands. The action taken can include the dropping of a command, forwarding of the command, modification of the command prior to forwarding, or other processor controlled actions. For example the processor can put the command into a queue and defer the forwarding of the command for a later time based on a scheduling policy and the state of the multiple host and target interfaces. The switch can execute commands received by a virtual target without forwarding them to the physical drive in order to implement switch features. When traffic pertaining to a feature not fully supported by the target device is received from a host, it can be acted upon by the interface switch to provide a simulation of the feature. In one embodiment, target drives that do not respond to spin up and spin down commands, and instead spin as long as they are supplied with power, can be controlled to spin down upon receipt of spin down commands by having the interface switch control the power applied to the drive.

In particular embodiments, the interface switch can include a general purpose input/output interface for communication signals, for example to update software stored in the switch memory, for device configuration and control, and to support various features. Examples of these communication signals include device power control signals, status information or control signals for an external display.

In a first aspect, the present invention provides a switch for connecting at least one host system to a storage device, the switch comprising: a plurality of host ports, each of the plurality of host ports for receiving data from and transmitting data to a host system; a target port for receiving data from and transmitting data to a target device; a memory for receiving and buffering data received by each of the plurality of host ports and the target port; and a processor for presenting a virtual target based on said target device to each of the plurality of hosts and to provide each of the plurality of hosts with transparent access to the target device.

In further aspect, the present invention provides an interface switch for communication between storage devices and hosts comprising: a host interface for communicating with at least two hosts; a target device interface for connecting to a target device; and a control unit for providing concurrent access to the target device interface by either of said at least two hosts; at least one of said host interface and target device interfaces capable of communicating via either of a first or second protocol.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as software routines (including instantiations of programmable state machines), hardware circuits, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

Embodiments of the present invention allow use of Serial ATA hard drives in redundant connectivity architectures by allowing more than one host to communicate to access single hard drive.

Figure 1:
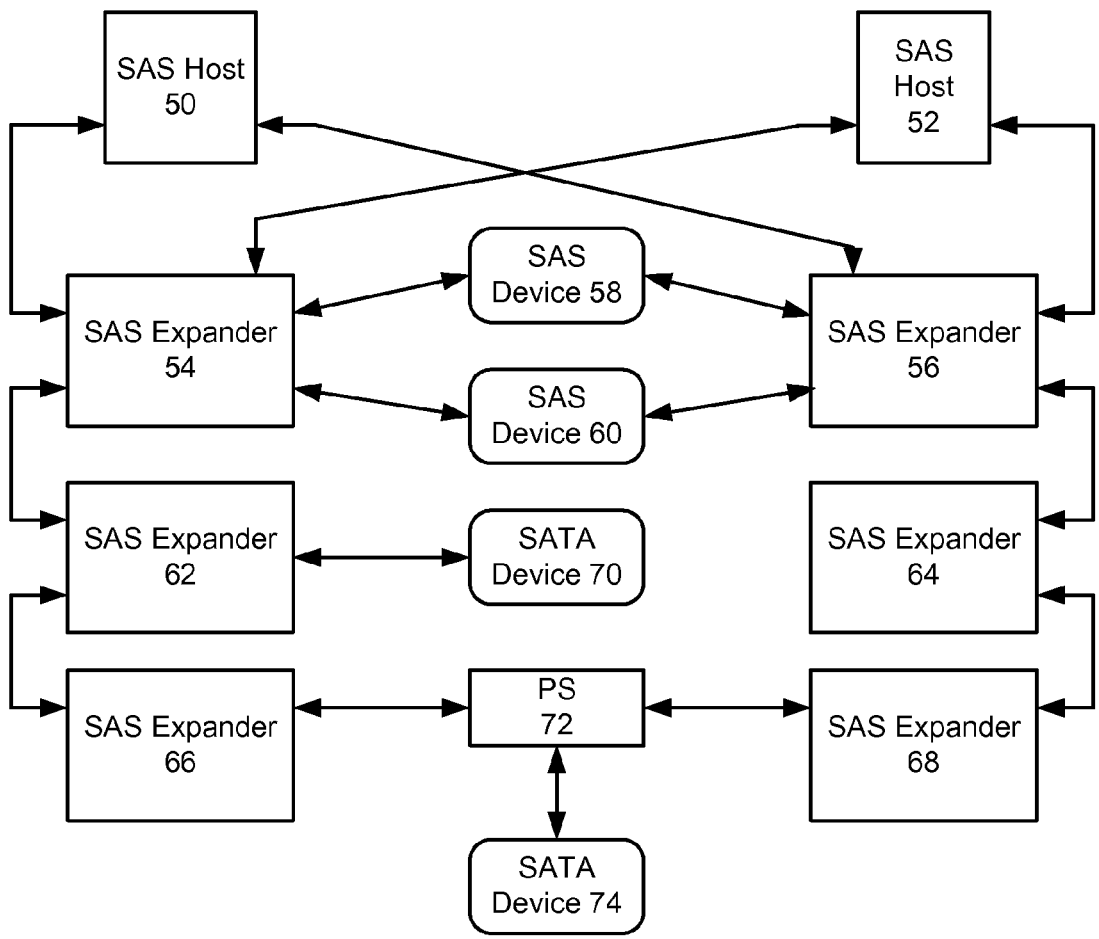
FIG. 1 is a block diagram illustrating a sample SAS topology.

FIG. 1 illustrates an exemplary prior art SAS topology for a storage network, incorporating SAS hosts, SAS expanders, SAS devices and SATA devices (such as SATA drives). Each of SAS hosts 50 and 52 are connected to SAS expanders 54 and 56. In turn, both expander 54 and expander 56 are connected to dual-ported SAS storage drives 58 and 60. Expander 54 is directly connected to expander 62, which is connected to expander 66. Expander 56 is similarly connected to expander 64, which in turn is connected to expander 68. Expander 62 also serves as a single point of connection to SATA drive 70. Expanders 66 and 68 connect to PS 72 (SATA port selector), which in turn provides them with a connection to SATA drive 74.

By providing redundant data paths between elements, a SAS topology increases the reliability of the storage network. If a single element in the SAS topology, including the links between elements, becomes unavailable, a path still remains between the SAS host devices 50 and 52 and any of the SAS devices 58 and 60 and SATA port selector 72. Only failure of two elements or failure of a device itself will render a storage device inaccessible. SAS expanders provide switching and routing functions among the devices that are attached to it.

As previously noted, both SAS devices and SATA drives can be attached to a SAS expander. When a SATA drive is connected to a SAS expander, a host will issue SATA commands to the SATA drive using STP, such that nodes in the SAS topology see only SAS data. The expander converts the STP data stream into a SATA data stream and transmits the SATA data stream, containing SATA commands, over a serial interface to the SATA drive.

The simplest manner in which a SATA drive can be connected into the storage network is through a direct connection to an expander, as shown by the connection of expander 62 to SATA drive 70. When a SATA drive is connected in this manner, SAS hosts within the same topology must coordinate access to the SATA drive using a SAS affiliation within the SAS expander. An affiliation is essentially a semaphore that allows one host to lock access to a SATA drive until it is finished with the device. The host must ensure the SATA drive is in an idle state before clearing the affiliation. Although drive 70 is connected to both SAS hosts through expander 62, it can only be accessed by a single host at any given time. Expander 62 tracks the ownership of the SATA drive using the SAS affiliation within the STP bridge function within the expander. This connection provides both SAS hosts 50 and 52 with access to the drive, but it is still a singly connected drive. If expander 62, expander 54, the connections between these expander, between expander 54 and either of the SAS hosts 50 and 52, or the connection between expander 62 and the SATA drive 70 fail, the connection between the SAS hosts and the drive becomes unavailable. Thus direct connection of SATA drive reduces the cost of storage, but does so at the cost of the redundancy provided by a dual ported connection.

To address this lack of redundancy, SATA port selector 72 can be used to connect both expanders 66 and 68 to SATA drive 74. This provides a redundant path to SATA drive 74, but requires that the hosts coordinate their communication with the SATA drive.

Figure 2:
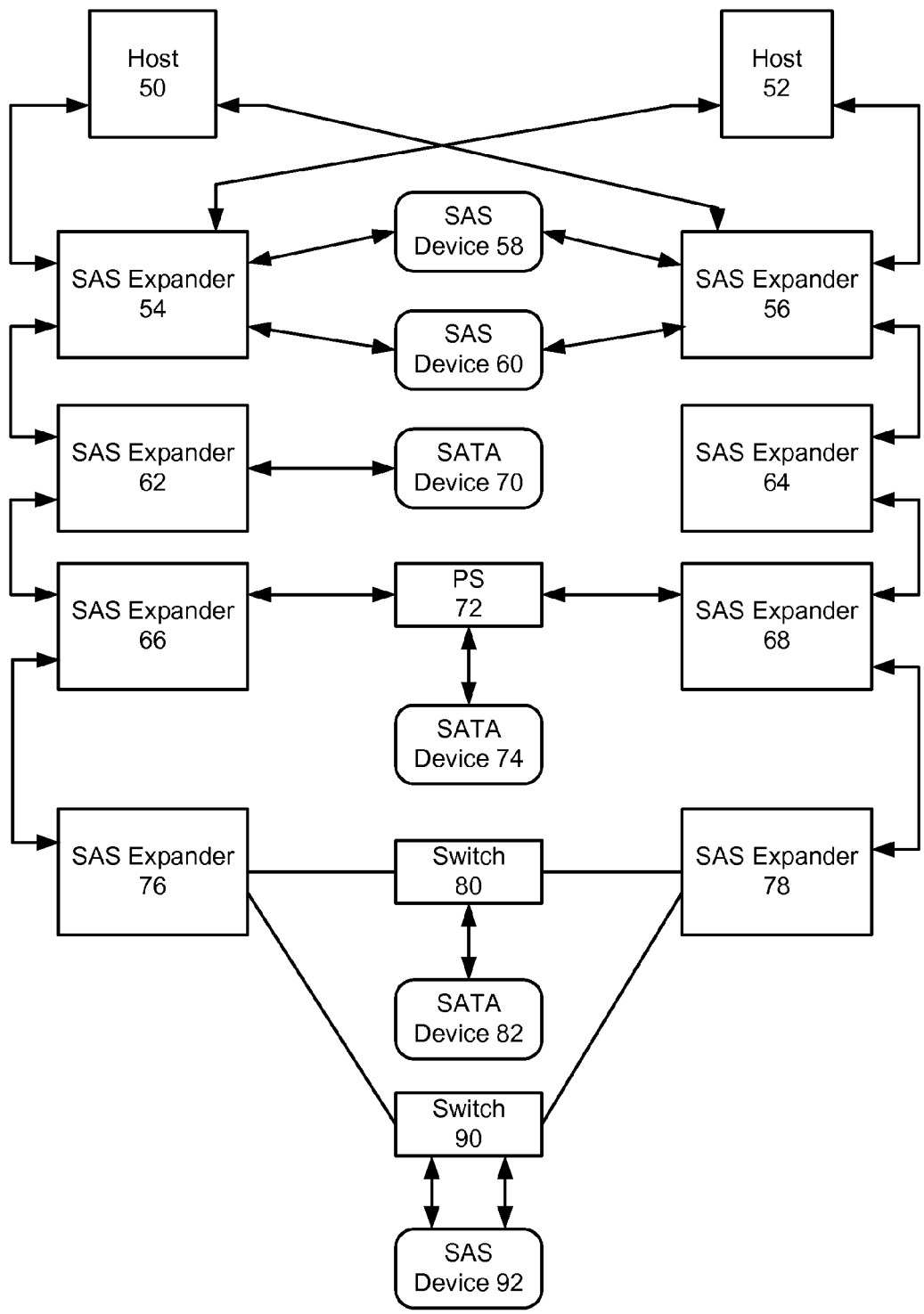
FIG. 2 is a block diagram of a sample topology illustrating the use of a interface switch according to an embodiment of the present invention.

FIG. 2 illustrates an embodiment of the present invention in a SAS/SATA topology. The SAS/SATA topology is identical to that of FIG. 1, but adds expander 76 connected to expander 66, and expander 78 connected to expander 68. These SAS expanders connect to multi-ported switch 80, which in turn provides concurrent access to a single-ported SATA device 82, and multi-ported switch 90, which in turn provides concurrent access to SAS drive 92 via a conventional two-port interface.

Switch 80 performs command switching between the accessing hosts to provide transparent and concurrent access to SATA device 82. Advantageously, the hosts do not need to co-ordinate their communication with a SATA drive, as the hosts can operate as if they had a single connection to the SATA drive. Similarly, Switch 90 provides transparent and concurrent access to SAS device 92.

Figure 3:
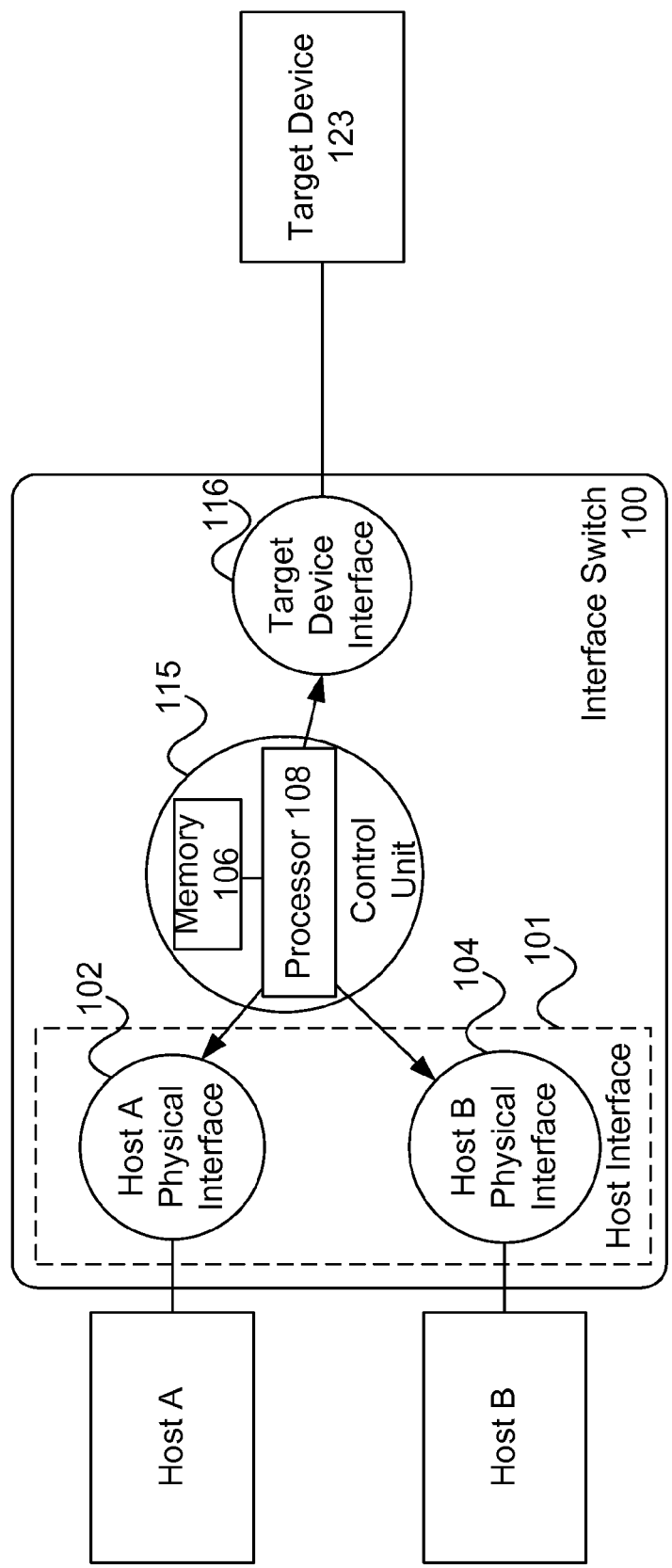
FIG. 3 is a block diagram illustrating an embodiment of the present invention.

FIG. 3 presents a block diagram according to one embodiment of the present invention, by way of example. Switch 100 comprises a host interface 101 for communicating with hosts, a target device interface 116 for connecting to a target device 123 and a control unit 115 for providing concurrent access to the target device interface by either of the hosts.

In FIG. 3 Host interface 101 includes Host interfaces 102 and 104 for communicating with hosts A and B, possibly via SAS expanders in a SAS topology. It should be noted that more than 2 hosts can be supported. The control unit 115 includes a processor 108 and memory 106. Memory 106 is used for storing data and instructions executed by the processor 108. A person skilled in the art will recognize that memory 106 can take various forms, and different memory means can be used for the data and the instructions.

At least one of said host interface 101 and target device interfaces 116 are capable of communicating via either of a first or second protocol. According to one embodiment the first protocol is a serially attached SCSI protocol and said second protocol is a Serial ATA protocol. Accordingly the interfaces include ports capable of receiving connectors which communicate using these protocols. Preferably the interfaces are serial interfaces which include high speed serial connection ports, for example SAS ports, which are capable of receiving either SAS or SATA connections. The target device interface 116 is typically a storage device interface for connecting to storage device. Depending on the embodiment, the storage device can take various forms, and can include either a SATA hard drive, or a SAS hard drive, as will be discussed in more detail below.

The control unit performs data buffering and processing. In the case where the device is a SATA device, it performs a switching function to allow concurrent access to the SATA device by more than one host, for example by interleaving commands.

Processor 108 controls switch 100 to provide the intelligent switching of access to the drive. Whereas some prior art solutions require the hosts to coordinate access, use of switch 100 allows hosts to operate independently of each other and simply provide a series of commands to the switch 100. In turn, switch 100 to provides the commands to the drive. When a device is connected to switch 100, processor 108 determines the parameters of the connected device. Switch 100 can implement intelligent FIS processing, and serve to terminate commands received from a connected host. This FIS processing can be employed to provide command switching. These commands can then be broken into logical operations that can be interleaved with logical operations from another host in order to provide effective concurrent access to the device. These logical operations are referred to as atomic sequences and can be defined as exchanges between a host and target that cannot be subdivided and interleaved, but instead must be carried out in their entirety prior to another operation being started. Switch 100 determines the start and end of the atomic sequences, and at the end of an atomic sequence makes switching decisions based on other received transactions. This allows switch 100 to receive commands from a plurality of hosts, and to switch between the received commands according to a predefined arbitration scheme.

An example of such a switching function can be found in the above referenced co-pending application "COMMAND SWITCHING FOR MULTIPLE INITIATOR ACCESS TO A SATA DRIVE", which is incorporated by reference in its entirety. This switching can be implemented in such a manner that the link and transport layer state information for each port and the command layer queue information is maintained. Queue, state and context can be maintained for each of a number of virtual targets (each virtual target corresponding to how a host perceives the connected target). This allows FIS information to be terminated, modified, buffered, and/or regenerated on each port so that operation of the switch is transparent to each connected host and the target.

NCQ FIS exchanges can be modified to ensure that queue tags used by different hosts do not overlap with each other from the perspective of the target. Processor 108 can be used to control the various protocol layers during communication between a host and target. It can place the switch into a bypass mode that passes data from the host to the drive, and from the drive to the host, allowing the link and transport layers to relay primitives and frames until the end of an atomic sequence or an anomalous event is detected, at which time processor 108 begins controlling the various protocol layers again. FIS information can be created by the apparatus in certain situations as well. Examples of such creation include when the processor 108 executes a command received at the virtual target and responds with FIS sequences related to that command. An additional example is during error recovery where the processor 108 will create a FIS to be sent by the virtual target to inform the host an error has occurred in the physical target.

Upon initialization or upon detection of a change in the external connections, processor 108 preferably interrogates the connected target/host to determine what is connected to the interface. This allows, for example, substitution of a SAS hard drive for a SATA hard drive without requiring operator reconfiguration of the switch 100. An example of this autodiscovery process is discussed in more detail below with reference to FIG. 6. In one embodiment the detection of the connected drive is performed by switch 100 in a similar manner to how a SAS expander determines the presence of COMSAS OOB events for SAS devices, and COMWAKE OOB events and COMSAS timeout events for SATA devices.

According to an embodiment of the present invention the interface switch is a multiported multiplexer which can provide multiple hosts concurrent access to a target device (for example a hard drive) using either a three or four port configuration. In the three port configuration the target device interface comprises a single port, whereas the target device interface comprises two ports in the four port configuration. In a three port implementation, target device interface 116 has a single port that is used to connect to a SATA drive. In a two port configuration, a dual ported SAS drive can be connected to dual ports. When target device 116 is implemented to provide dual ports, and only a single port is used (i.e., is connected to a single ported SATA drive), the other port remains idle. Preferably autodiscovery is used, so that the SATA drive can be connected to either of the dual ports, and to allow hot swapping of the drives without further configuration or wiring changes, and can allow pass-through of SAS data streams. In either the three or four port configuration, the switch can support interleaving of both non-queued and NCQ command transactions from two host ports to a single SATA port.

Each serial interface preferably has the ability to mimic the operation of a SATA drive, SATA host bus adapter, SAS target/initiator as well as a SATA port selector. The serial interfaces can perform this operation by adjusting an internal OOB state machine for the desired mode of operation. For SAS operation, the interface can generate COMRESET and COMSAS events as defined in the SAS standards. For SATA operation, the interface can generate COMRESET, COMWAKE, and COMINIT as defined in the SATA standards, or a SATA port selection signal, as defined in the SATA Port Selector specification. This allows the switch to appear as a SATA drive, a SAS drive or an STP target device to SAS hosts, as a SAS target/initiator to SAS drives, or as a SATA port selector or SATA drive to SAS expanders or SATA hosts that have been specifically configured to interact with port selectors. This functionality is used so that hosts are presented with an interface that appears to be a direct connection to the device they are being indirectly connected to. Similarly, the target can be presented with an interface that appears to be a standard host. Alternatively, if a SAS device is connected as the target, switch 100 can present itself in a manner that mimics the SAS initiators connected to the switch.

Each serial interface can optionally announce that it is part of a port selector by responding to a COMRESET with a COMWAKE rather than a COMINIT. Independent of the mode of operation of the switch 100, each serial interface can also detect the SATA port selection signal. The consequential action taken by the switch 100 upon detecting the SATA port selection signal is configurable. Configurable consequential actions can include a switch of active hosts when operating as a port selector, power cycling of an attached drive, or a reset of the switch 100.

Each of the interfaces can have multiple methods of performing speed negotiation including SAS based speed negotiation, SATA based speed negotiation, and speed negotiation snooping. For instance, for SATA port selector operation, the switch 100 must ensure that the host interfaces 102 or 104 and the drive target device interface 116 operate at the same rate. Typically the switch 100 would negotiate freely on all interfaces, check for consistency, and reset the links if the link rates were mismatched. In an embodiment details of how rate negotiation is performed are discussed in the above referenced co-pending application entitled "SERIAL ATTACHED SCSI (SAS)/SERIAL ATA (SATA) RATE SNOOP ALGORITHM", which is hereby incorporated by reference.

In an embodiment, switch 100 can detect the type of device it is connected to on both host and target interfaces. When the attached device is a SAS device, the switch can be configured to announce itself as SAS device during the speed negotiation process. This process is similar to the speed negotiation process discussed in the previously cross-referenced application entitled "SERIAL ATTACHED SCSI (SAS)/SERIAL ATA (SATA) RATE SNOOP ALGORITHM". After all the host/target ports have completed the speed negotiation, the switch can proceed to the SAS link initialization process. Subsequently, the switch provides a SAS STP virtual target device on each host interface.

Each of the interfaces can incorporate high-speed transceivers that support the Physical layer specification for both SAS and SATA at both 3 Gbit/s and 1.5 Gbit/s link speeds, plus OOB signaling. One skilled in the art will appreciate that embodiments of the present invention can operate at data rates other than the presently defined 3 Gbit/s and 1.5 Gbit/s, and further embodiments will support higher speeds such as the proposed 6 Gbit/s standards. The transceivers can tolerate various SSC on the receive links, including SATA SSC, to be compatible with SATA devices that transmit data with SSC clocking.

All ports can support the SAS link initialization sequence. During the initialization sequence between SAS devices, the ports exchange IDENTIFY Address frames with the remote end. The received IDENTIFY address frames contain information such as the SAS address of the device attached to the other side of the switch 100. When connection is established between a host and drive, a full-duplex data path is set up to pass through data and primitive Dwords between the ports. In the present invention, the IDENTIFY information provided on the host port is the IDENTIFY information received from the target port, and visa versa. Thus, indirectly connected targets and hosts operate as if they were directly connected.

Each of the interface ports is capable of indicating link activity. Link activity indicates that a SATA FIS or SAS frame is in transit on the corresponding port. This activity can be determined using any of a number of known techniques including detection of a start of frame (SOF), a SATA_SOF primitive or an end of frame (EOF). These per port link activity indications can be displayed using activity LEDs or other general purpose outputs under the control of the control logic.

The switch 100 can function as any one of a SAS regenerator/retimer, a SATA port selector in a backward compatibility mode, and a SATA multi-port multiplexer that can include support for native command queuing. The term regenerator/retimer should be understood to refer to a signal regeneration functionality that allows for the receipt, buffering and general cleaning up of a signal so that the signal can be transparently forwarded without either of the end point nodes being aware the signal was processed by an intermediate device. For example the control unit comprises processor means for transparently forwarding the contents of signal between said interfaces without the appearance that the signal passed through an intermediate device.

According to an embodiment, the switch can compensate for clock rate differences depending on the state of the protocol being transmitted over the SAS serial links. For example, in order to account for delay between the SAS devices, interface switch 100 supports STP flow control to avoid the underrun/overrun of buffers in SAS devices.

The system can also automatically insert/delete ALIGN characters to compensate for the rate difference between the links.

Operating as a regenerator, switch 100 connects a SAS storage device to SAS hosts (optionally through SAS expanders). Although the SAS standard allows for long cable lengths between components, it may be advantageous to use the switch 100 to regenerate signals so that guaranteed serial link performance is obtained. The switch 100 can perform out of band (OOB) signaling and speed negotiation to ensure rate consistency between two ports. ALIGN primitives can be inserted and deleted to manage the frequency offsets between transmitter and receiver serial links. Furthermore, while in this mode, the present invention can make use of the IDENTITY frame pass through feature described above to appear transparent to the connected elements. STP flow control can be performed as described above.

When functioning as a SATA II port selector, the switch 100 can perform OOB signaling and speed negotiation on each port to ensure rate consistency between the two ports in addition to standard port selector features. The switch 100 can also insert and delete ALIGN primitives to manage the frequency offset between the transmitter and receiver serial link rates. STP flow control can be integrated at the link layer as described above.

In the port selector mode, the switch 100 can be configured a configuration setting to generate the Port Selector COMWAKE identification sequence. The switch 100 can support OOB port selector switch signaling, as well as side-band port selector switch signaling using general purpose input/output ports as inputs. The serial links can support active/passive (inactive link is squelched) or active/active (both links at PHYRDY, but only one link is carrying command and data traffic) switching. This COMWAKE identification sequence can be used in other modes to allow switch 100 to communicate that an interface switch is present.

In the SATA multi-port multiplexer mode with optional Native Command Queuing, the multiplexer can perform OOB signaling and speed negotiation on each port and ensure rate consistency between the three ports. The switch 100 can process a series of SATA FIS's received from multiple SATA hosts and addressed to a SATA device. The switch 100 can provide support for SATA II Native Command Queuing (NCQ) commands and legacy ATA commands.

Because primitives are passed through switch 100 and are analyzed by processor 108 while buffered in memory 106, devices that have known communication problems with other system elements can be supported by having the processor 108 modify primitives as they pass through. Processor 108 can be used to add/drop/modify primitives passed between host and device if required.

Figure 4:
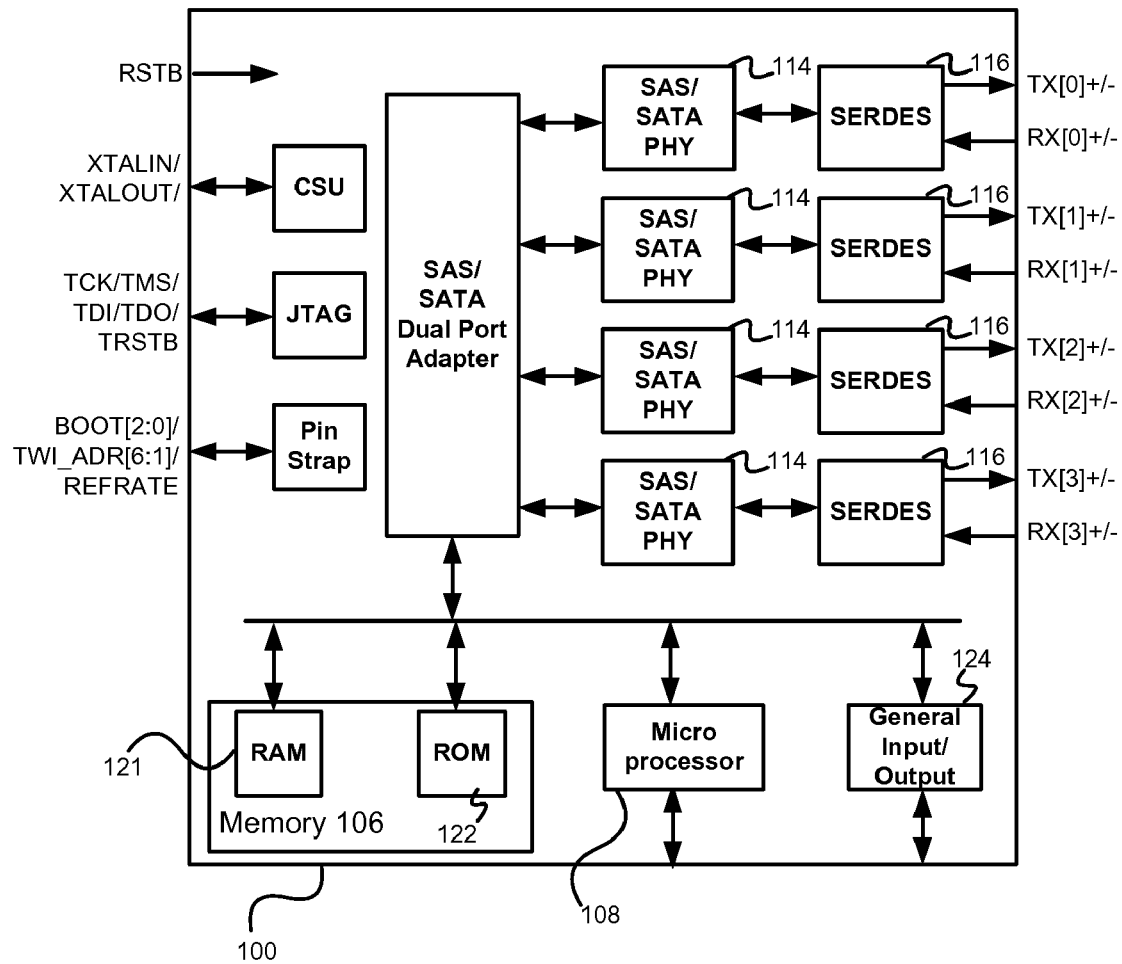
FIG. 4 is a block diagram illustrating an embodiment of the present invention.

FIG. 4 illustrates an exemplary logical implementation of the system of FIG. 3. Switch 100 with memory 106 (illustrated in this embodiment as Random Access Memory 121 and ROM 122) and processor 108 (illustrated as the microprocessor) communicate with other elements using PHY interfaces 114 connected to serializer-deserializer (SERDES) 116. The SAS/SATA Dual Port Adapter, makes use of link and transport layers, which in combination with PHY 114 and SERDES 116 provides the functionality of any one of the interfaces of FIG. 3. Configuration and updates to the functionality and operation of the switch 100 can be done via general purpose input/output interface (GPIO) 124 which may include a number of external interfaces including pin-strap settings and serial connections. This interface can also be used to update firmware stored in an EEPROM implementation of ROM.

The switch 100 can employ general purpose interface 124 for a number of other purposes including drive power control, visual indicators, configuration of the target, or for side-band signaling to and from the switch. The general purpose input/output can also control visual indicators that can provide an indication of faults or activity. These indicators can either be controlled by switch 100 or by a connected host. For example, multi-master/slave serial interfaces or general purpose input/output pins can be provided for various features, for example, activity LEDs, fault LEDs, HDD control, side-band port selector inputs, readiness LED, PHY ready LED indications, or device power control. It can also support an external configuration EEPROM or pin strapped configuration.

By terminating commands received from the connected hosts, switch 100 can present the connected hosts with a virtual target. The virtual target has characteristics based on the characteristics of the actual target or characteristics which the switch can emulate. Connected hosts transmit commands to the virtual targets, where they are terminated. On the basis of the terminated commands, interface switch 100 can drop, modify, or forward commands to the target device. In the event that the target does not support a feature reported by the virtual target, the feature is provided by interface switch 100. In one example of this simulation of features, spin up control of a target will be discussed.

Some SATA hard drives do not wait until reception of an OOB COMWAKE sequence to begin spinning up, and instead spin up immediately upon receipt of power. Although in a desktop setting this is not an issue, in a drive array having all drives spin up at the same time can exceed the power supply capacity of a system and cause failure. Furthermore, lack of this features prevents power management in large scale drive arrays. An embodiment of the invention can emulate this functionality for a SATA drive that does not provide spin up control by use of general purpose input/output 124. This is done by controlling the power applied to a drive that behaves as described above. This can be done through either a direct control of the drive power, or through a switching system in the drive power chain that is under the control of switch 100. Power is withheld from such a drive until an instruction is received from a connected host to spin up. The instruction to spin up can be provided in a number of different ways, including the reception of a NOTIFY primitive, OOB sequences such as a SATA port selection signal or an OOB COMWAKE sequence, or simple command.

Interface switch 100 determines whether is has been appropriately connected to such a device using GPIO 124, and if so it presents, to a connected host, a virtual target of a SATA device that is capable of spin up control. Upon receipt of a COMWAKE primitive from the host, the virtual target will terminate the command, and switch 100 will effect power up of the target device.

Control of the power to the target can also be done in response to an internal configurable algorithm to schedule drive power, in response to OOB signaling from a connected host, in response to reception of a specific command such as a SAS NOTIFY primitive, in response to instructions received while in a SATA port selector mode, or in conjunction with an internal spin up delay that can be used to stagger the startup of drives in a drive array.

As noted above, the switch 100 can operate as a single or dual channel SAS signal retimer/regenerator. In this mode, a SAS host initiator high-speed serial interface is routed to a SAS target device high-speed serial interface. In this mode, switch 100 has four active ports, referred to as host A port, host B port, target port and bypass port. The two independent links can be supported between the host A port and target port, and the host B port and bypass port. One skilled in the art will appreciate that in this mode, the bypass and target ports function in the same fashion and the independent links can be made between the host A port and the bypass port, and the host B port and the target port without departing from the scope of the present invention. Those skilled in the art will appreciate that each physical port can be remapped using logical-to-physical port mapping.

Entry into this mode can be accomplished based on a setting read during startup, or recognition that a SAS hard drive is connected to both target and bypass ports. While in this mode, switch 100 can recognize the removal of the connected SAS hard drive, at which time, it can then begin monitoring to detect the connection of a new SAS or SATA hard drive. Differentiation between SAS and SATA hard drives can also be performed by using COMSAS and COMWAKE events. COMSAS events are only generated by SAS devices, while COMWAKE events are only generated by SATA devices. Differentiation between a SAS and a SATA target can be performed using any of a number of techniques, including the issuance of an OOB COMSAS event, and determining if a response is received before a timeout timer expires. As a SATA drive will not respond to a COMSAS event, a received response can be considered as indicative of the presence of a SAS device, while failure to receive a response can be considered as an indication that the connected target is a SATA drive.

Switch 100 preferably ensures that negotiated rates on host ports and target ports are the same. Note that this does not prevent two hosts from connecting to the drive at distinct rates (e.g. the host A-to-target link can operate at 1.5 G while the host B-to-bypass can operate at 3.0 G). Switch 100 preferably negotiates the highest rate possible unless restricted from doing so. If a common rate cannot be negotiated, the link can be reset and the speed negotiation can be retried. Other responses to failure to obtain a common negotiated rate include generating and reporting an error message, execution of a self diagnostic routine and modifying port configuration values to address the issue. The configuration settings that may be modified include serial interface configuration settings such as signal swing.

Conventional speed negotiation on a SAS link is based on a peer-to-peer negotiation technique that does not assume initiator and target roles. The sequence comprises a set of speed negotiation windows for each physical link rate, starting with 1.5 Gbit/s, then 3.0 Gbit/s, and then the next rate. As noted above, an exemplary method for rate negotiation is disclosed in previously cross referenced application "SERIAL ATTACHED SCSI (SAS)/SERIAL ATA (SATA) RATE SNOOP ALGORITHM" which has been previously incorporated by reference in its entirety.

Interface switch 100 can relay commands between the host and target in a transparent fashion, so that neither the target nor the host are aware that the commands have passed through an intermediate device. These commands can include both in-band and OOB signals. In one example of this transparent activity, switch 100 can propagate COMRESET/COMINIT commands between the host and target ports after both ports have achieved PHYRDY and when the host or target sends a COMRESET/COMINIT (and hence loses the PHYRDY). In SAS Retimer/Regenerator mode, switch 100 preferably does not propagate COMRESET/COMINIT between the host and target ports before both ports have achieved PHYRDY. One skilled in the art will appreciate that OOB events can be propagated at any time, although depending on the configuration of the switch 100, only certain subsets of OOB events may be propagated. The propagation subsets can differ based on whether the host or the drive initiates the event.

In SAS Retimer/Regenerator, the two host-to-target links (e.g. host A-to-target and host B-to-bypass) can operate independently. For example a COMRESET signal can propagated from the host A port to the target port. The COMRESET signal does not necessarily get replicated on either the host B or bypass ports.

The switch 100 typically does not independently generate SAS IDENTIFY frames, but instead passes the frames through transparently, although they may be modified prior to being passed through. This allows switch 100 to not announce its presence on the SAS link, preventing problems that may arise from the functionality of switch 100 not being defined within the SAS standard, but at the same time provides the ability for switch 100 to enhance the functionality offered by the virtual target. In some embodiments, switch 100 can generate its own IDENTIFY frames. For example it can announce as a SAS expander or an end device. When announcing as an expander, features such as table routing and SMP can be enabled. The IDENTIFY frames preferably come from the "upstream" and "downstream" devices attached to switch 100. The switch 100 buffers IDENTIFY frames from both directions prior to the completion of speed negotiation on both links.

In the SAS standard, it is specified that IDENTIFY frames should be exchanged within a 1 ms timeout limit. To provide the ability to exchange IDENTIFY frames within this, or another specified limit, processor 108 can co-ordinate the speed negotiation processes used on the host and target interfaces. By controlling or restarting the speed negotiation process on one or more of the interfaces, switch 100 can obtain the IDENTIFY frames at approximately the same time. This allows switch 100 to relay the IDENTIFY frames between the host and target within the specified time window. If IDEN-TIFY frames are not received in the specified time limits, switch 100 can restart the OOB speed negotiation sequence by resetting host and target ports. Switch 100 can also buffer an IDENTIFY frame when one interface becomes active before another is ready to receive the frame.

HARD RESET primitives is considered to be valid if received within a defined time period after PHYRDY has been asserted. Upon receipt of a HARD RESET primitive, processor 108 can perform any of a number of functions, as specified by a modifiable instruction set. In one such set of instructions, a HARD RESET primitive is relayed to the other side of an interface (i.e. from host A to drive or from drive to host A). Another such set of instructions may result in the generation of a HARD RESET primitive without the generation of a valid IDENTIFY frame on one or more of the ports that had not generated the HARD RESET primitive.

In SAS Retimer/Regenerator mode, the two host-to-target links (host A-to-target and host B-to-bypass) operate independently. A HARD RESET primitive propagated from the host A port to the target port does not get replicated on either the host B or bypass ports.

Various settings for handling NOTIFY (Enable Spinup) primitives on a host or target port are possible due to the fact that the primitive is received and handled by processor 108 prior to transmission to the drive. In one configuration, switch 100 controls the transmission of the NOTIFY (Enable Spinup) primitive on the peer port thus allowing coordinated spinup of a large number of drives through multiple multiplexer devices using high port count initiators. If a system is designed such that drive spin-up requires co-ordination between hosts, the switch 100 can be configured to delay NOTIFY (Enable Spinup) propagation until the NOTIFY primitive is received on both host ports. In a system without the higher layer spin-up control multiple switch 100 devices could contain different settings for the initial spin-up delay such that a common reset would result in staggered NOTIFY generation within the system. One skilled in the art will appreciate that, NOTIFY (Enable Spinup) primitives are received by switch 100, and are acted upon in a manner determined by processor 108. This allows for autogeneration of NOTIFY (Enable Spinup) primitives on one or more ports, generation of NOTIFY (Enable Spinup) primitives on specific ports determined by the received primitive, and generation of NOTIFY (Enable Spinup) primitives on specific ports determined by other signaling. As noted, switch 100 can make use of control of the power supplied to target drives to provide spinup control on drives that do not respond appropriately to the NOTIFY (Enable Spinup) primitive. As discussed, this power control can be achieved by making use of external control signals or an internal power switching function.

In SATA Port Selector mode, switch 100 functions in accordance with the standards defined in the Serial ATA II: Port Selector specification. This mode of operation allows different host ports to connect to the same target in order to create a redundant path to that device. While operating in the Port Selector mode, switch 100 can still present virtual targets to the hosts to allow support for additional features not natively supported by the target. Although while operating as a Port Selector, the functionality of switch 100 is not fully utilized, it does provide the ability for access to a SATA drive to be shared between hosts. The upstream ports of the switch 100 can also be attached to a Port Multiplier or a Serial ATA Switch to provide redundancy in a more complex topology.

Enhancements to the standard port selector, including a number of the features outlined above, can be provided to avoid known problems with port selectors. These enhancements can include holding off a drive from spinning up by withholding the COMWAKE signal (i.e. integrated spin-up control), holding off a host port from achieving PHYRDY state until a common supported rate is found (i.e. integrated rate snooping); holding off a host port from achieving PHYRDY state until a SATA device is attached; and SATA link layer (SDPA) functionality to ensure requirements related to FIS packet transmission and flow control primitives (such as SATA_HOLD and SATA_HOLDA) are met. Those skilled in the art will appreciate that these enhancements can be provided as described above by having processor 108 act on commands issued by connected hosts to the virtual target presented.

Whereas in SAS speed negotiation, there is no master/slave relationship, in the SATA PS mode, switch 100 preferably can interact as a master device.

If spin-up control is enabled, the target port will be prevented from going PHYRDY until the host port rate has been detected or the host port has reached PHYRDY. This can be done using either a drive supported spin up control feature, or by a processor enabled drive spin up/power control feature. During this time if a COMRESET is received from the active host it will be propagated to the device. A COMRESET received on the inactive host port need not be propagated to the device. Whether automatic spin-up is enabled or spin-up control is enabled, and whether rate snooping is enabled or not, the switch 100 will reach a state awaiting PHYRDY on both the selected host port and the device port. During this state, any COMRESET/COMINIT signals received on the active host/target port will be propagated to the complementary port. A COMRESET received on the inactive host port is not propagated to the device. When the spin-up control is enabled in Port Selector mode, the switch 100 can prevent the device activating until the host port rate has been detected or the host port has reached PHYRDY. Many SATA devices will not spin-up until a COMWAKE signal has been received. By withholding the COMWAKE signal on the device port, the switch 100 prevents the device from spinning-up. While in Port Selector mode, the switch 100 will not release the device port from spin-up hold until the host port rate has been detected or the host port has reached PHYRDY.

A Port Selector has a single active host port and a single inactive host port. In one embodiment, side-band port selection and protocol-based port selection are both supported. Side-band port selection uses a mechanism outside of the Serial ATA protocol to determine which of the two host ports is active. Protocol-based port selection uses a sequence of Serial ATA out-of-band signals to select the active host port. After selection of a new active host port, the target is in an unknown state. It may have active commands outstanding that need to be flushed. These outstanding active command would have originated with the previously active host. After an active host port switch has been performed, a COMRESET out-of-band signal can be issued to the device to ensure that the device is in a known state.

The GPIO interface 124 can be used as a set of hardware select lines that allow each host to signal that it desires to be the active host and achieve access to the device. A rising edge on the designated GPIO can serve as indication that a host desires to be the active host.

The loss of PHYRDY on either the device port or the active host port can put switch 100 into a power management state while functioning as a port selector. Switch 100 can be brought out of the state by receipt of a COMRESET or COMWAKE signal on the active host port, in response to a COMINIT or COMWAKE signal on the device port, and in response to a new active host being selected.

Figure 5:
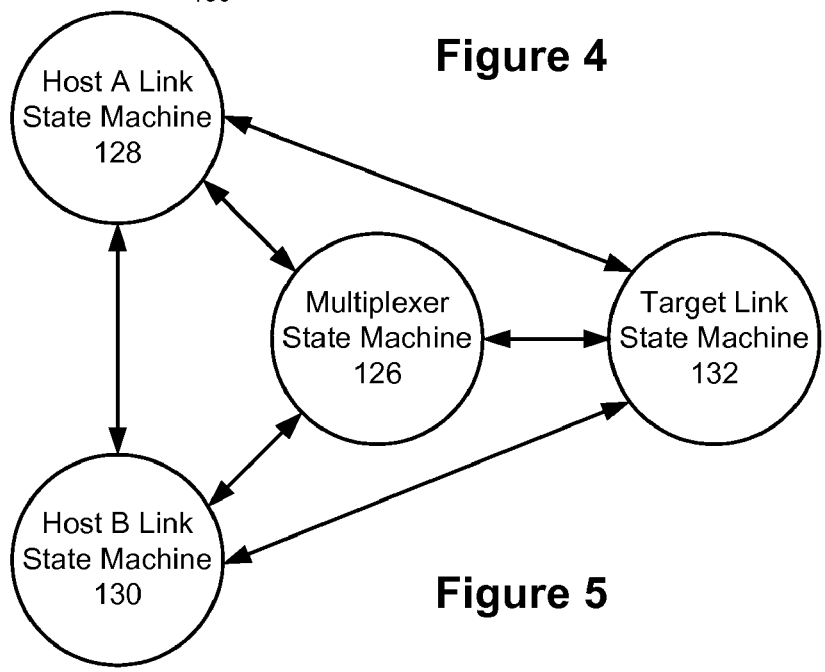
FIG. 5 is a state machine interaction diagram.
Figure 6:
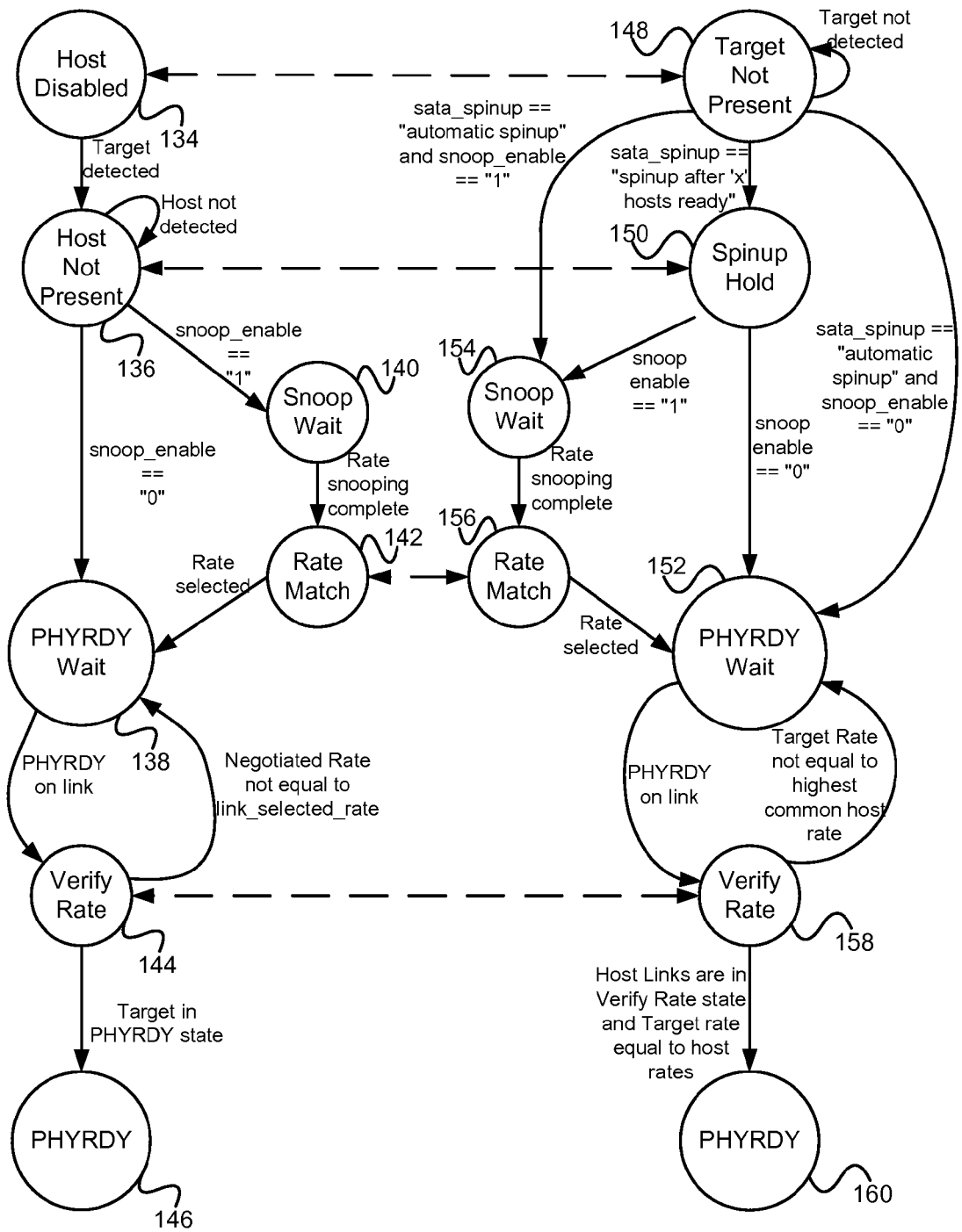
FIG. 6 is state diagram for host and target link ports.

Whereas the first two discussed modes provide functional enhancements over conventional implementations, the switch 100 can also provide a novel operating mode, the multi-active SATA multiplexer mode. In this mode, processor 108 is used to provide intelligent switching between multiple active hosts to provide concurrent access to the single SATA target port. In the following discussion, the interaction of the state machines illustrated in FIG. 5 becomes relevant. Arrows connecting state machines in FIG. 5 indicate the monitoring of state information between the state machines. As illustrated in FIG. 5, the switch 100 includes a multiplexer state machine 126, Host A Link State Machine 128, Host B Link State Machine 130, and Target Link State Machine 132. The multiplexer state machine 126 performs command switching and other related activities. Each of the three link state machines 128 130 and 132 are responsible for bringing their respective link out of reset to the PHY Ready state. They each preferably provide support for spin up hold, OOB propagation, rate negotiating and snooping as well as rate matching. If the connected target does not support features, the target link state machine 132 can enable the unsupported features as discussed above. Each link state machine 128, 130 and 132 monitors the states of the other link state machines to provide the synchronization required for the rate-matching feature as illustrated in FIG. 6. The multiplexer state machine 126 implements the switching algorithm. It monitors the state of the three link state machines and allows links that are in the PHY Ready state to participate in the switching operation. If required, the multiplexer state machine 126 can also initiate a link reset in any link state machines to enable error handling recovery. The following discussion will provide more detail on the link operations prior to the description of FIG. 6.

Operation of the host links and the state of the device link can be interlocked. This allows switch 100 to present a virtual SATA target device to hosts, so that the topology is not altered. Each host interacting with the SATA hard drive attached to the target link proceeds as if it was connected to the presented virtual target device. To allow this, switch 100 will disable host links when the SATA hard drive is not detected. This can be done by not responding to COMRESET primitives. The host links can be reset by the processor when the target link loses PHYRDY (at which time multiplexer can transmit a COMINIT OOB sequence in an attempt to restart the link initialization); and the target link is reset if both host links lose PHYRDY. If only one of the host links goes down, the target link can be conditionally brought down based on the confirmation and activity present on the host and target links at the time the link went down.

In multi-active SATA multiplexer mode switch 100 can supports spin-up control of the attached target device as discussed above with respect to the previously described operational modes. While in multi-active SATA multiplexer mode the switch 100 typically will not release the device port from spin-up hold until one host port (or both) has reached an appropriate state of the link initialization process.

As discussed above, with respect to the other modes of operation, switch 100 can optionally employ rate snooping methods to determine a link speed prior to presenting the drive as PHYRDY. These rate snooping methods preferably arrive at a common speed for the host-target port pairing.

Speed negotiation can be performed so that that switch 100 achieves rate consistency across all active ports. To do so, switch 100 can allows each port to become PHYRDY prior to checking for a common rate. Preferably the highest common rate is adopted among the three ports.

The switch can reset the target port upon detection of a loss of PHYRDY on the host port if the host port is in the middle of a transaction with the target, if the host port has outstanding command that have been issued to the target, and under a number of other circumstances including if the switch is configured to reset the target upon loss of PHYRDY on the host under all circumstances. The switch 100 can continue to allow any remaining connected host to communicate with the target while it completes the link reset sequence on the failed host port. Upon reaching PHYRDY again, the formerly failed host port can resume connections to the drive. Prior to reaching PHYRDY on the failed port, switch 100 can treat all COMRESEST events as a part of speed negotiation, and does not need to perform a reset of the multi-active multiplexing functions.

Switch 100 can control OOB events transmitted between the target and one host in order to minimize disrupting the other host's access to the target. This can include intelligently suppressing OOB events belonging to a handshaking process to the target when the other host is active. In one embodiment, a set of conditions or rules can be specified and applied by processor 108 during FIS processing. In such an embodiment, when a host has not established an active link (e.g. has not reached PHYRDY), COMRESET messages can be assumed to relate to link initialization, and thus can be terminated by the processor 108 and not relayed. In a further example, a COMRESET message received from a from a host that has an active link (e.g. has reached PHYRDY) can be handled according to a predetermined configuration parameter of the switch. Unexpected messages, such as receipt of unsolicited COMINIT messages may be handled by the processor 108 through resetting all links, unless the target is in a spinup hold state. Receipt of a command specific to one mode of operation while in another mode of operation (e.g. receipt of a command suitable for a SATA port selector mode while operating in a multiactive SATA multiplexing mode) can also be handled according to an initialization setting that takes various states and conditions into effect in the determination of the appropriate action. A COMWAKE or a COMSAS arriving on any of the links can be ignored. If the receipt of either the COMWAKE or the COMSAS result in the link becoming inactive (loss of PHYRDY), the normal actions for such an event will be applied as described below with regard to the link state machine of FIG. 6.

FIG. 6 describes a link initialization sequence for switch 100 in multi-active SATA multiplexer mode. One skilled in the art will appreciate that the below described sequence is merely exemplary, and should not be considered as limiting. The host link state machine 128 or 130 starts in a Host disabled state 134. Upon detecting a target, the Host Not Present state 136 is entered, and is maintained as long as no host is detected. When a host is detected, the state machine proceeds to PHYRDY Wait 138 if rate snooping is not used. Otherwise, a snoop wait state 140 is entered, followed by a rate matching state 142 upon completion of the rate snooping. When a rate is selected, the machine proceeds from state 142 to 138. When PHYRDY is posted on the link a rate verification state 144 is entered. The PHYRDY Wait 138 and rate verify state 144 will be alternated between if the negotiated rate is not equal to the selected link rate. If, while in the rate verify state 144 the target is determined to be PHYRDY, the target link state machine will proceed to PHYRDY 146.

In the target link sate machine 132, the initial state is a target not present state 148. When a target is detected, the state machine proceeds to PHYRDY wait 152 if spin up is automatic and rate snooping is disabled. If spin up is automatic and rate snooping is enabled, snoop wait state 154 is entered instead. If spin up is delayed, a spin hold state 150 is entered. From state 150, if snoop is enabled the snoop wait state 154 is entered, whereas PHYRDY wait 152 is entered if snoop is disabled. From snoop wait state 154, the state machine proceeds to the rate match state 156 upon completion of the rate snooping, and from there proceeds to PHYRDY wait 152 upon selection of a rate. When the link is PHYRDY the verify rate state 158 is entered. A fall back to PHYRDY wait 152 is possible if there is a rate mismatch. Otherwise, the PHYRDY state 160 is entered.

Various states illustrated in FIG. 6 are preferably synchronized (or roughly synchronized) so that messages passed between host and drive are properly handled. As illustrated, Host Disabled 134 and Target not Present 148 are typically aligned (especially at initialization of the switch 100), as are the rate match states 142 and 156 and the verify rate states 144 and 158. During the rate match and verify rate states, the host and drive need to pass messages to each other to verify status, thus requiring the confluence of the states.

Figure 7:
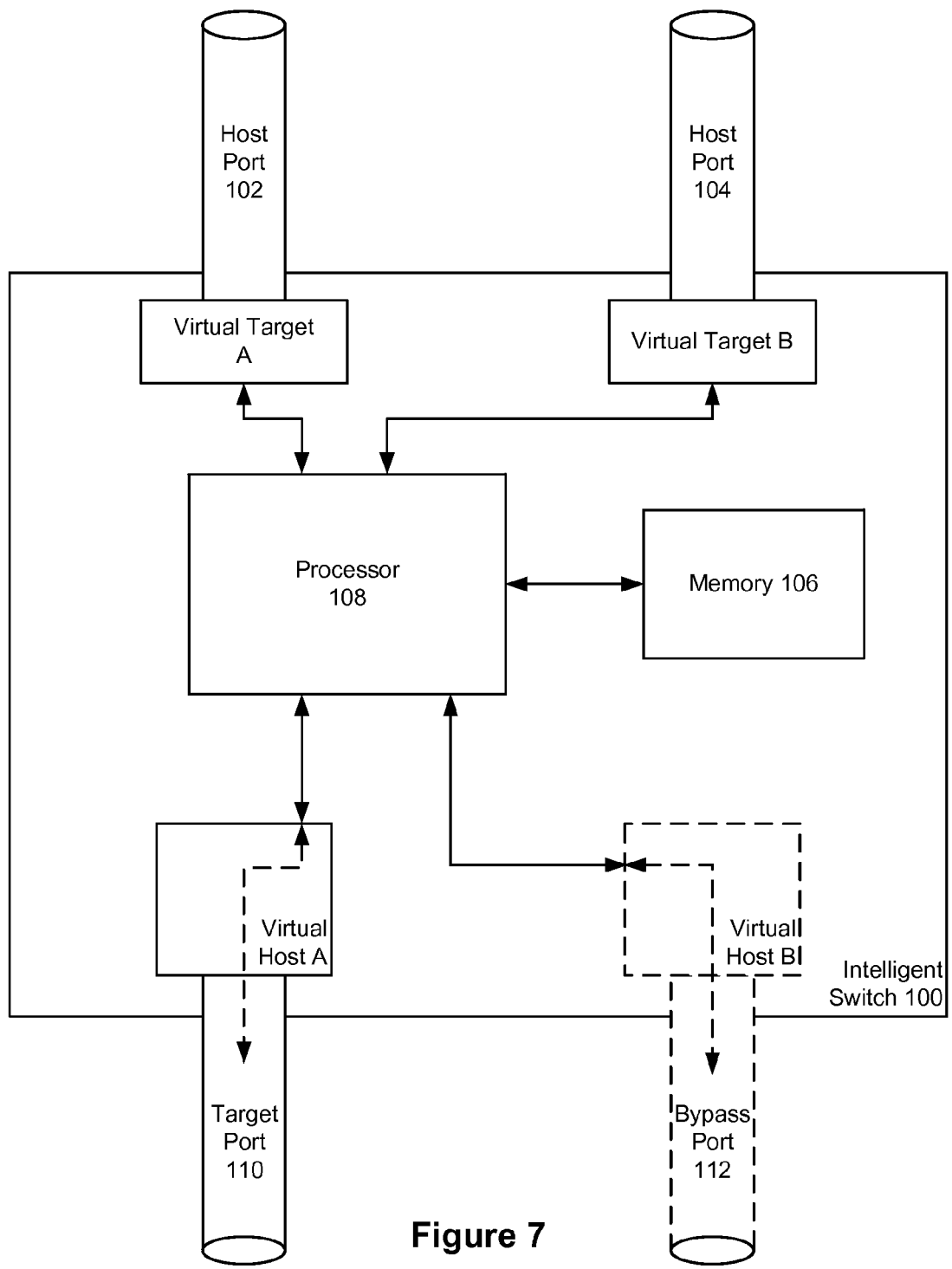
FIG. 7 is a block diagram illustrating an embodiment of the present invention

FIG. 7 illustrates an embodiment of the present invention, where switch 100 connects to hosts through host ports 102 and 104, and through these ports receives data and commands that are processed by processor 108 and stored in memory 106. Access to a target device is provided through target port 110 and optionally through bypass port 112. As noted above, the assignment of a physical port to the logical functions described with regard to this figure is performed by the processor 108, and thus, any physical port can be reassigned to serve as another port. Bypass port 112 is optionally provided to allow for dual ported access to a SAS device. Target port 110 can be used to access both a SAS device and a SATA drive. One skilled in the art will appreciate that switch 100 can have additional host ports without departing from the scope of the present invention. The current illustration has been limited to two ports only for the sake of simplicity, and this should not be construed as limiting to the scope of the present invention.

Communication with SAS and SATA targets through target port 110 and bypass port 112 can be performed at various link speeds. Host ports 102 and 104 can be used to communicate with SATA initiator devices, SAS initiator devices and SAS expanders, which for the following discussion will be generically referred to as hosts. Processor 108 is responsible for announcing an identity to each connected host. This identity is typically based on the characteristics of the connected target device. Thus, for example, when a SATA drive is connected to target port 110, processor 108 creates virtual host A for communicating with the SATA drive via port 110. Processor 108 also creates virtual target A and virtual target B, which announce themselves, over the respective host ports 102 and 104 as SATA drives. In contrast, a SAS drive is connected via target port 110 and bypass port 112 and processor 108 creates virtual host A and virtual host B for communicating with the SAS drive via ports 110 and 112 respectively. Processor 108 also creates virtual target A and virtual target B, which announce themselves, over the respective host ports 102 and 104 as SAS drive ports. As a result, a connected host looking at switch 100 will see a connected target device having properties defined by processor 108 which may differ from the properties of the connected target.

While operating as in a SAS retimer mode, commands received on each host port can be terminated by switch 100, and relayed over the target port associated with the particular virtual host. This provides retiming and regeneration functionality, without either host or target aware of the presence of the switch 100.

When operating in the multi-host SATA multiplexer mode connected to a SATA device, each host is presented with an individual virtual SATA device as the connected target. As before, commands received from the host can be terminated and then acted upon by the processor. The virtual target can be presented as either a virtual SATA device, or as a SAS STP target device. When the virtual target is presented as a SAS STP target device, STP termination can be done by switch 100 instead of at an upstream SAS expander. According to an embodiment of the invention, the STP virtual target can perform the STP connection setup, tear-down at frame boundaries between atomic sequences. STP connection setup/tear-down does not have to occur outside of atomic sequence boundaries. If an atomic sequence is stalled where the host is waiting for a FIS from the target, it is perfectly acceptable to close the STP connection and reuse the resources for other SAS connections. The host will recognize that that particular drive is in an atomic sequence and therefore will not attempt to transmit anything unrelated to the atomic sequence (such as another queued command) to that drive until the atomic sequence is completed.

The termination of commands by switch 100 allows the processor to enhance the functionality of the drive, by adding features to the announced virtual target that are not present in the physical target. One such possible feature is spin up control of the drive. If the connected target does not support spin up and power control features, the switch can simulate control of these features by generating power control signals for use in controlling the power to the target. In some embodiments, the device can incorporate means for controlling the power directly. In other embodiments, these power control signals are sent, via GPIO 124, to an external power controller.

Other modifications to the characteristics of a connected target can be implemented, including changing the reported size of the queue of the target to allow for each connected host to use non-overlapping portions of the drive queue exclusively. This exclusive use of drive queue portions allows for simplified identification of which host has pending commands in the drive queue.

Switch 100 provides transparent connections between the hosts and the target device. The use of virtual targets and a virtual host allow the hosts and target device to be unaware of the presence of the switch, and does not require coordination of target access between hosts.

One skilled in the art will appreciate that the discussion of virtual hosts and targets is presented from a logical perspective, and that specific software and hardware constructs need not be implemented to provide the functionality, or to enable the present invention. Processor 106 can provide this functionality by presenting the characteristics of the virtual target/host and by receiving, terminating, and optionally dropping/forwarding/modifying and forwarding commands, primitives and OOB sequences between a host and target. This allows for transparent access and provides the ability to offer an enhanced feature set. This further allows for switch 100 to modify communication between a target and a host so that known incompatibilities are resolved without error or detection.

As discussed above, switch 100 can implement intelligent switching algorithms that make use of atomic sequences to denote the point at which command switching between hosts can occur. Command transactions can be received into memory 106 and analyzed by processor 108. The intelligent analysis allows switch 100 to switch between the hosts by tracking the FIS transactions to find the start and end of the atomic sequences and makes switching decisions at the boundary of atomic sequences. When the non-switched host issues command transactions, they can be buffered in memory 106. These atomic sequences can be roughly alternated between hosts, or other algorithms can be used. The switch 100 can also track the NCQ FIS exchanges to modify the queuing tags to ensure that the tags used by the two hosts do not overlap with each other from the HDD perspective.

SATA commands can be considered as being part of one of two groups: Non-Queued commands and Native Command Queued (NCQ) commands. The handling of these two types of commands can differ, as atomic sequencing of the two types of commands can differ. The handling of these commands is described in detail in the related, and cross referenced application entitled "COMMAND SWITCHING FOR MULTIPLE INITIATOR ACCESS TO A SATA DRIVE" which has been previously incorporated by reference in its entirety.

A SAS/SATA PHY Layer Controller (SSPL) can be implemented using processor 108. The SSPL can be used to execute the SAS/SATA reset and power-up sequences, including link initialization and speed negotiation. Once a link has been initialized, the SSPL can perform Dword alignment and 8B/10B processing before forwarding the data stream onto the link layer.

By intelligently handling received data, and making use of the processor 108 to analyze the traffic flow, switch 100 can provides the features outlined above. It should be noted that in addition to passing data from a drive through to a host, processor 108 can determine that various FISs or frames should not be transmitted, and can either modify, drop and/or replace any data received with other data determined in accordance with the configuration of the multiplexer and the FIS in question.

By providing the ability to operate in a number of modes, switch 100 makes use of the ability of processor 108 to analyze traffic, and decide on the basis of stored primitives, FISs and other signaling commands, to route and modify the data traffic. This stands in contrast to the prior art which simply attempted to switch between hosts to provide a roughly redundant data path. By intelligently routing received data, switch 100 can serve as a retimer/regenerator, an intelligent switch or as a simple port selector.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A switch for connecting a plurality of host systems to a single target storage device, the switch comprising:
   a plurality of host ports, each of the plurality of host ports receiving data from and transmitting data to a host system of the plurality of host systems;
   a target port receiving data from and transmitting data to the single target storage device;
   a memory receiving and buffering data received by each of the plurality of host ports and the target port; and
   a processor configured to present separate independent instances of a virtual target storage device based on the single target storage device to each of the plurality of host systems, each independent instance of the virtual target storage device having the functionality of the single target storage device, and to provide each of the plurality of host systems with transparent access to the single target storage device by providing each of the plurality of host systems direct and concurrent connection to the single target storage device through its corresponding independent instance of the virtual target storage device without any of the plurality of the host systems having knowledge of the switch or the shared nature of the single target storage device.

2. The switch of claim 1 wherein said processor provides said transparent access by transmitting data through each of the plurality of host ports and the target port, the transmitted data determined in accordance with an analysis of the source, destination and contents of the data buffered in the memory.

3. The switch of claim 1 further including a second target port for receiving data from and transmitting data to the single target storage device.

4. The switch of claim 3 wherein the single target storage device is a serially attached SCSI drive.

5. The switch of claim 3 wherein the processor includes auto-discovery means for determining that the single target storage device is one of a serially attached SCSI device and a Serial ATA device.

6. The switch of claim 5 wherein the auto-discovery means includes means for transmitting a serially attached SCSI out-of-band sequence to the device and for determining that the device is a serially attached SCSI device in response to a reply to the transmitted out-of-band sequence.

7. The switch of claim 6 wherein the out-of-band sequence is a COMSAS sequence.

8. The switch of claim 5 wherein the auto-discovery means includes means for transmitting a serially attached SCSI out of band sequences to the device and for determining that the device is a Serial ATA device in response to a failure to receive a reply to the transmitted out of band sequence in a predetermine time period.

9. The switch of claim 1 wherein the single target storage device is a Serial ATA device.

10. The switch of claim 1 wherein the virtual target storage device emulates a Serial ATA compliant target device.

11. The switch of claim 1 wherein the virtual target storage device emulates a Serial ATA Tunneled Protocol complaint target device.

12. The switch of claim 9 wherein the processor provides concurrent access to said Serial ATA device to each of the plurality of host systems.

13. The switch of claim 9 wherein the processor includes means to switch access to the single target storage device between each of the plurality of host systems on a boundary of atomic sequences.

14. The switch of claim 13 wherein the memory includes a queue structure having at least one command queue entry for buffering commands from the plurality of host ports for each virtual target storage device.

15. The switch of claim 1 further including a nonvolatile memory for storing a set of processor instructions.

16. The switch of claim 15 further including a serial interface for updating the nonvolatile memory.

17. The switch of claim 1 wherein the processor includes means to analyze data received by one of the plurality of host ports to determine the existence of a specific instruction, and for transmitting through the target port an instruction different from the specific instruction.

18. The switch of claim 1 wherein the processor includes means to analyze data received by one of the plurality of host ports to determine the existence of a specific instruction and for not transmitting data through the target port when the specific instruction is received.

19. The switch of claim 18 wherein the means to analyze data further includes means to transmit a predetermined instruction in place of the specific instruction when received.

20. The switch of claim 18 wherein the means to analyze data further includes means to simulate a function on the single target storage device in response to the specific instruction.

21. The switch of claim 20 wherein the specific instruction is a spin up control instruction, and the means to simulate the function includes means to control power to the single target storage device in response to the specific instruction.

22. The switch of claim 20 wherein the specific instruction is an error message, and the means to simulate the function includes means to control power to the single target storage device in response to the specific instruction.

23. The switch of claim 1 wherein the processor includes a signal regenerator for transparently forwarding a signal between at least one of the plurality of host ports and the target port.

24. The switch of claim 1 wherein the processor includes means to analyze data received by the target port, to modify the received data and to transmit the modified data to at least one of the plurality of host ports.

25. The switch of claim 1 wherein the processor includes means to analyze data received by the target port and to not transmit the data to one of the plurality of host ports in accordance with the analysis of the received data.

26. The switch of claim 1 wherein the virtual target storage device presented by said processor includes target device characteristics which differ from the characteristics of the single target storage device.

27. The switch of claim 1 wherein each of the plurality of host ports includes means to provide a connection between each of the plurality of host systems and the respective virtual target storage device that is independent of the connection between other host systems of the plurality of host systems and respective virtual target storage devices.

28. The switch of claim 1 wherein the processor includes means to align a first speed negotiation between a host system and the presented virtual target storage device and a second speed negotiation process between the target port and the single target storage device.

* * * * *